Oct. 3, 1961 B. L. SNAVELY 3,003,066
GATING CIRCUIT FOR SCANNING TRACE CONVERTER
Filed Feb. 25, 1959 4 Sheets-Sheet 1

INVENTOR.
BENJAMIN L. SNAVELY

Oct. 3, 1961    B. L. SNAVELY    3,003,066
GATING CIRCUIT FOR SCANNING TRACE CONVERTER
Filed Feb. 25, 1959    4 Sheets-Sheet 4

INVENTOR.
BENJAMIN L. SNAVELY
BY
ATTORNEYS.

United States Patent Office 3,003,066
Patented Oct. 3, 1961

3,003,066
GATING CIRCUIT FOR SCANNING TRACE
CONVERTER
Benjamin L. Snavely, State College, Pa., assignor to the United States of America as represented by the Secretary of the Navy
Filed Feb. 25, 1959, Ser. No. 795,566
11 Claims. (Cl. 250—219)
(Granted under Title 35, U.S. Code (1952), sec. 266)

The invention described herein may be manufactured and used by or for the Government of the United States of America for governmental purposes without the payment of any royalties thereon or therefor.

The present invention relates to a scanning trace converter, and more specifically, to a device for converting a trace which has been recorded on a tape into an electrical signal.

Devices of this character have been known in the past as curve followers, among other titles, and have consisted of a sensing stylus, which may be a beam of light, and which is moved by a servomechanism so as to maintain contact with the curve being traced. Curve followers or trace converters have been designed to be used with either transparent film or with material which is substantially opaque to light. In the first instance the trace converter may be designed to utilize the light transmitted through the film, whereas in the second case, when light is used as a stylus, the trace converter must be designed to employ the reflected light from the surface of the paper or other material on which the trace is drawn. Such devices find their utility in such applications as re-creating a signal which has been recorded as a result of some experiment and which it is desired to study in more detail and at greater leisure after the experiment has been performed. Curve followers are also vital parts of many types of computing machines and an important tool for the analysis of data recorded by pen writing or photographic recorders. In many instances curve followers can be used to replace relatively expensive mechanical cams used in many types of fire control equipment.

One of the difficulties which has existed with many of the prior devices of this character has been the relatively slow response time of servomechanisms which have been required to follow the curve tracing. In those types of devices which employ a scan, there has existed the difficulty of producing a linear scan. Another difficulty which has been experienced by the prior art devices has been the production of spurious signals resulting from scratches or blemishes in the material on which the trace has been drawn.

The present invention is an improvement over the U.S. patent application of Benjamin L. Snavely, Serial No. 653,257, filed April 16, 1957, now Patent No. 2,961,547. This prior application employs a scanning system in which the scanning beam executes simple harmonic motion, or some other periodic motion. In general, the system employs a source of energy having a higher frequency than that of the trace which is being scanned. This energy is used to control the scan and is applied through an electronic switch to produce the output of the circuit. During the time that the switch is closed the output from the source is passed through the switch and is integrated in the output circuit such that the output during each cycle is the time integral of the input evaluated over the interval during which the switch is closed. For a more detailed description of the operation, and theory thereof, of this prior invention reference should be made to the aforesaid application.

The present invention is based upon the fact that the filter in the output circuit of the trace converter acts as a short time memory of the position of the trace. Consequently, the output signal may be used to determine the portion of the scanning cycle during which the gate is to be open. Conceptually, the easiest method for accomplishing the control would be to provide a sinusoidal voltage which is the analogue of the motion of the scanning spot and which is at every instance related to the displacement of the scanning spot in the same way that the output voltage is related to the trace displacement. The gate then would be opened only during the times that these two voltages were nearly equal. In practice it is more practicable to have the scanning analogue voltage 180 degrees out of phase with the displacement of the scanning spot and to open the gate only when the algebraic sum of this voltage and the filtered output voltage is nearly zero.

It is an object of the present invention to provide a trace converter employing a periodic scanning motion.

It is another object of the present invention to provide a trace converter having a high speed of response.

Another object is to provide a trace converter which minimizes the effect of spurious markings on the trace carrying medium.

A further object is the provision of a new comparison circuit.

A still further object of the invention is to provide a new gating circuit.

Yet another object of the present invention is the provision of a trace converter employing a new comparison circuit and a new gating circuit to thereby give a high speed of response.

Other objects and many of the attendant advantages of this invention will be readily appreciated as the same becomes better understood by reference to the following detailed description when considered in connection with the accompanying drawings wherein.

Figure 1:
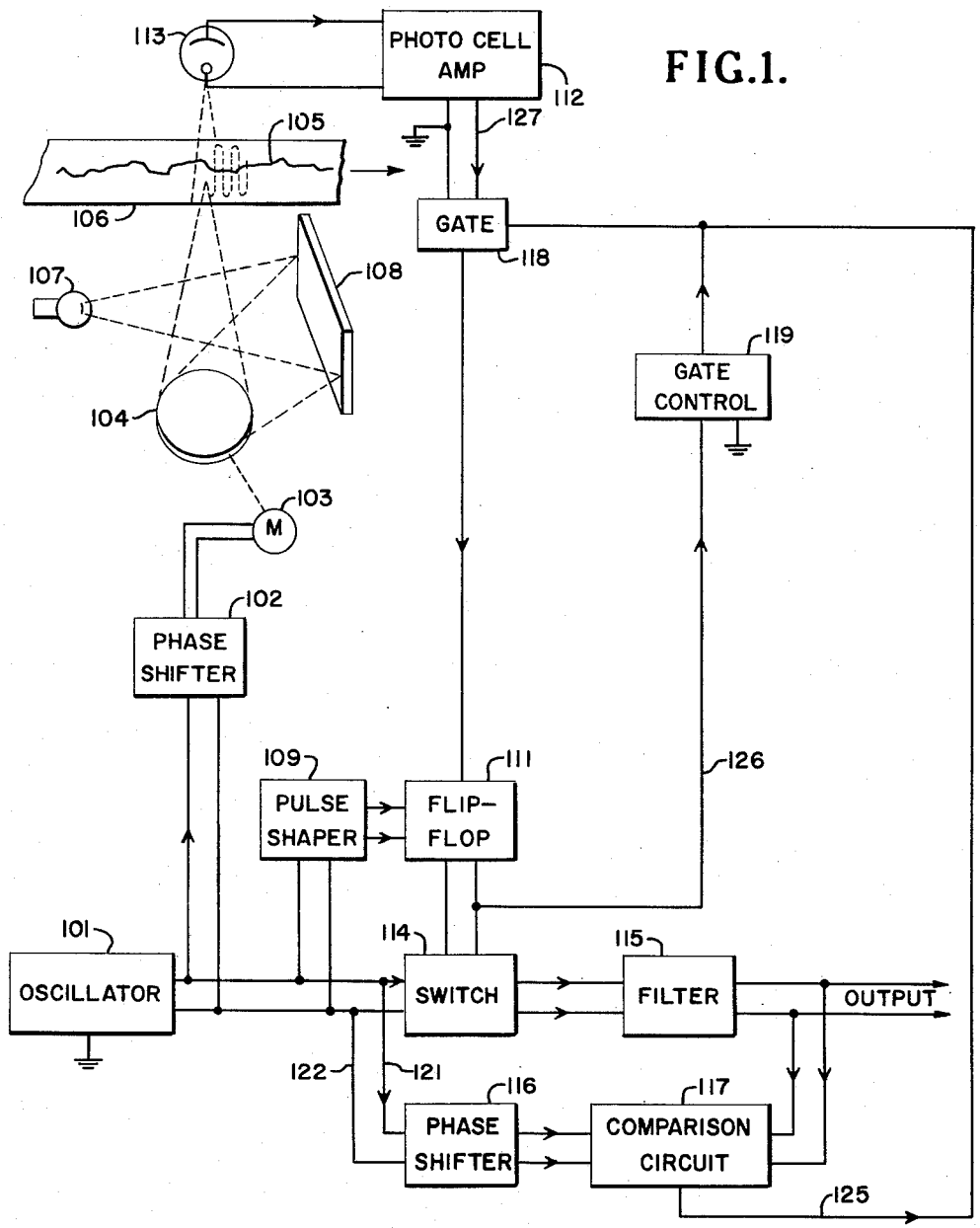
FIG. 1 is a block diagram of the electronic system of a trace converter employing the new gating system.
Figure 2:
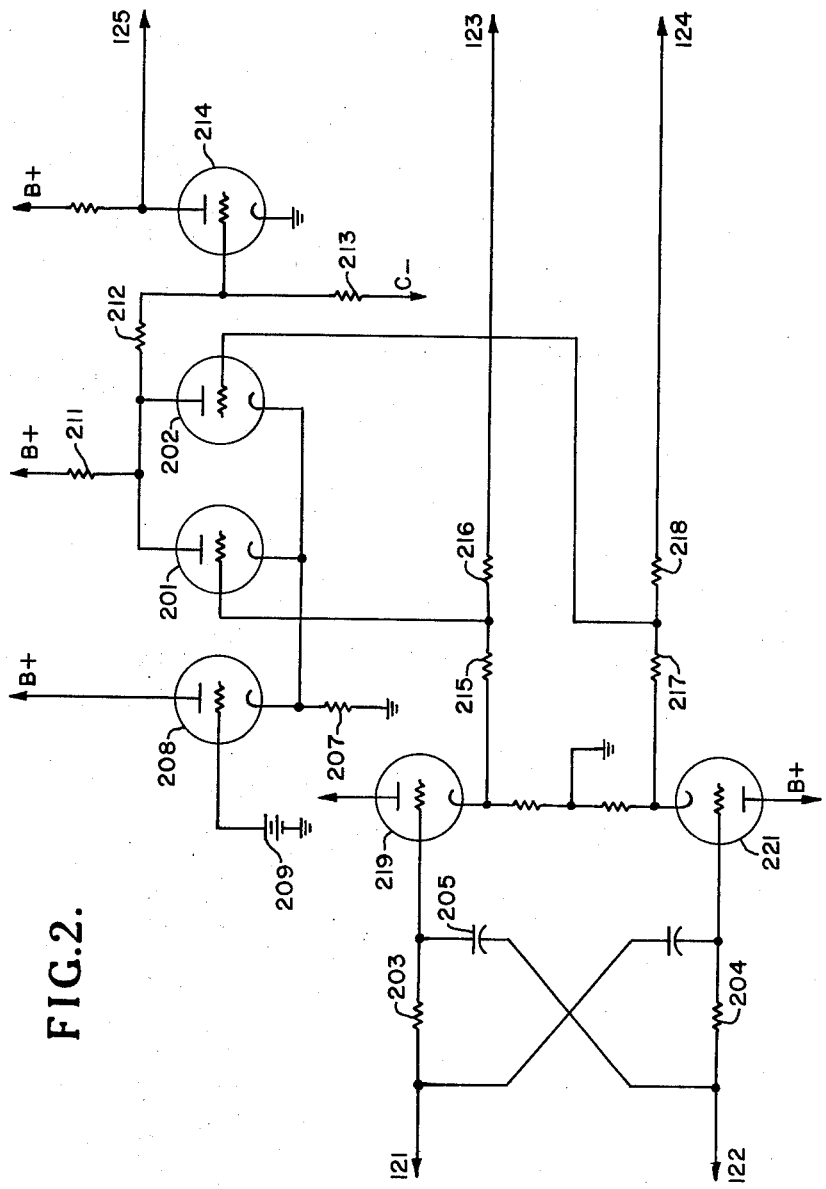
FIG. 2 is a circuit diagram of the phase shifter and voltage comparison circuits.
Figure 4:
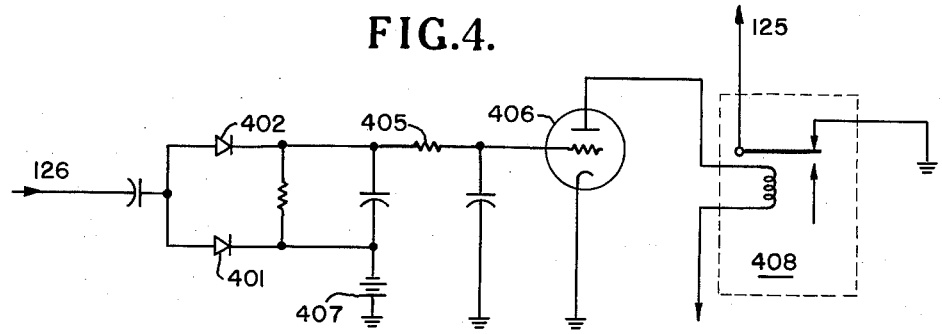

FIGS. 3(a) through (e) disclose the voltage-time relationships in certain parts of the circuit of FIG. 2;

FIG. 4 is a diagram of the control circuit which opens the gate of FIG. 1; and

Figure 5:
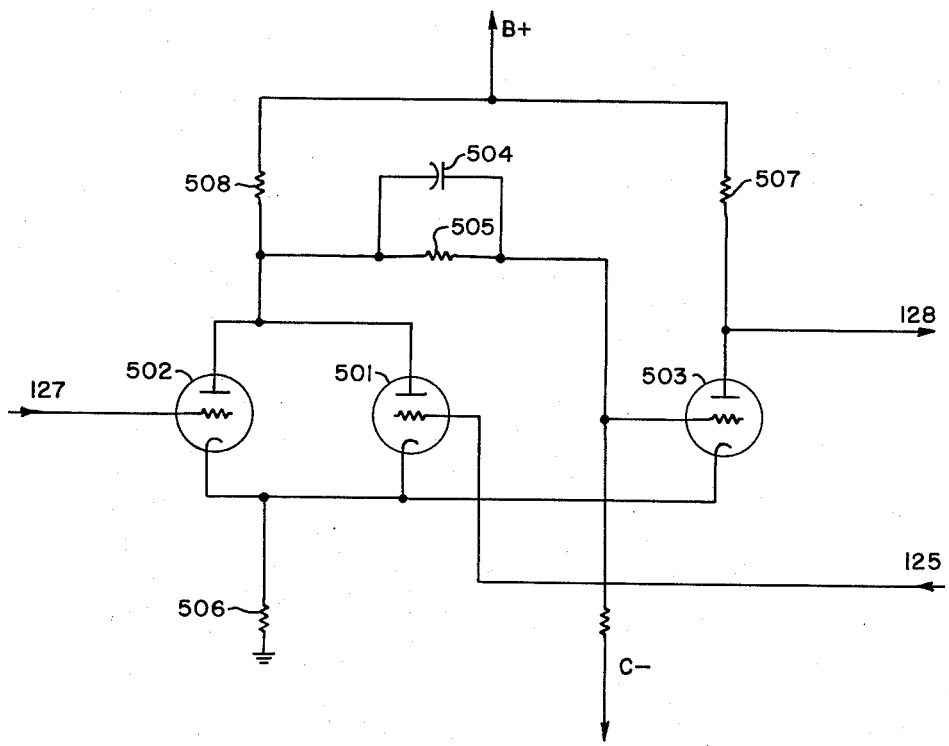

FIG. 5 is a circuit diagram of the gate.

It should be noted that FIG. 1 of the present invention is, with the exception of certain added elements quite similar to FIG. 1 of the application Serial No. 653,257 referred to hereinbefore. When the gate of the present circuit is open, so as to permit the flow of pulses from the photocell amplifier to the flip-flop, the operation of the present system is in all essential respects similar to that of said prior application.

Referring now to the drawings wherein like reference characters designate like or corresponding parts throughout the several views, there is shown in FIG. 1 a block diagram illustrating the present invention together with a general showing of the relationship of said diagram to the scanning system. The oscillator 101 produces an output having a sinusoidal voltage curve which is applied through phase shifter 102 to drive a motor 103 which vibrates mirror 104 to scan the trace 105 on the moving tape 106 by means of lamp 107 and reflecting mirror 108. The output of the oscillator 101 is also applied to a pulse shaper 109. The pulse from the pulse shaper is used to trigger a flip-flop or bistable multivibrator 111 into one of its two stable conditions. The multibrator 111 remains in its first triggered state until it is again triggered by an amplified pulse from the amplifier 112 and photocell 113 of the scanning system. The pulse from the photocell is produced by the passage of the scan over the trace and results in the opening of the switch 114 which had been previously closed by the pulse from the pulse shaper 109 acting on the flip-flop 111. During the time switch 114 has been closed, the voltage from the oscillator 101 has been passed to the filter 115. This filter functions during the operation of the trace converter to integrate the segments of the sinusoidal wave passed by the electronic switch 114 and produces an output which is the time integral of the sinusoidal input, evaluated over the interval during which the switch is closed.

The circuit is designed so that the pulse from the pulse shaper 109 always triggers the bi-stable multivibrator 111 to a certain one of its stable states. The output of the multivibrator is a square wave the pulse width of which is determined by the time interval between the pulses received from the pulse shaper 109 and those from the photocell 113. These pulses may vary in their time spacing and, therefore, the portion of the wave form from the oscillator which is transmitted by the electronic switch 114 will vary in accordance with the length of the pulses from the multivibrator 111. The filter 115 removes the high frequency components introduced by the electronic switch so that the output voltage will correspond to the position of the trace at any given instance.

The details of an optical scanning system for use with the trace converter, such as generally shown in FIG. 1 (elements 103 through 108 and 113), may be found by reference to the aforementioned copending application. The particular details of the optical scanning system is not a part of the instant invention, and it should be realized that the types disclosed in said application or other suitable ones could be used in the device of the instant invention.

A phase shifter 116 and a comparison circuit 117 are connected to the oscillator and output circuit, respectively, as shown in FIG. 1. The output of the comparison circuit is applied to control the gate 118. The application of this signal to control the gate is controlled by the gate control 119. The particular circuit details and function in the circuit of FIG. 1 of the above elements will be better understood with reference to FIGS. 2, 3, 4 and 5.

The details of the elements represented in FIG. 1 by the blocks labeled Phase Shifter, 116, and Comparison Circuit 117, are shown in FIG. 2. A balanced push-pull signal from the oscillator 101 is applied to the leads 121 and 122. A fraction of this signal, after passing through a phase shifting network, a pair of cathode followers and a voltage divider circuit, appears on the grids of tubes 201 and 202. The phase of the signal to these grids is adjusted to be in phase with the displacement of the scanning light spot by the phase shifting network consisting of the resistors 203 and 204, and the capacitors 205 and 206. Also appearing on the grids of tubes 201 and 202 is a portion of the voltage applied across leads 123 and 124 from the output of the trace converter.

Tubes 201 and 202 have a common cathode resistor 207 which is also shared with tube 208. A lower limit to the cathode potential of these three tubes is established by the fixed potential applied to the grid of tube 208 by the battery 209. The resistors 211, 212 and 213 are so proportioned that for given B+ and C− voltage the voltage drop across tube 214 will be small when tubes 201 and 202 are both cut off, and also so that any increment of the voltage on either of the grids of tubes 201 and 202 above cut-off will produce a rapid increase in the potential on lead 125 until the grid of tube 214 becomes so negative that this tube cuts off.

It will be seen presently that when lead 125 is at its most negative potential the gate 118 between the photocell amplifier and the flip-flop will be open whereas when the lead 125 is at its most positive potential the gate will be closed. This transition of the gate from open to closed position will occur over a voltage range. However, because of the amplification in tubes 201, 202 and 214 only a small increment in the voltage on the grid of either 201 or 202 above a certain value will be required to bring about the transition. For example, it may be considered that this voltage range is of negligible width so that the operation of the gate is characterized by a certain threshold voltage which is just slightly above the grid cut-off voltage for tubes 201 and 202 and which is determined by the battery 209. If both grids are below the threshold the gate is open, if either grid is above the threshold the gate is closed.

A voltage between the grids of tubes 201 and 202 may be related to a displacement on the sheet carrying the trace, the displacement being measured along the path of the scanning spot. However, there are two ways of determining such a relationship. One is given by the ratio between the instantaneous sinusoidal voltage across the grids and the corresponding displacement of the scanning spot. The other is given by the ratio of the output voltage appearing across these grids to the displacement of the trace which produced the voltage. The relative value of these two ratios will be determined by the relationship between the resistors 215 and 216, and between 217 and 218. These resistors are chosen so that the two voltage-displacement ratios will be equal in magnitude, however, the connections to the output and to the oscillator are made so that the algebraic signs of these ratios are opposite.

In FIGS. 3(a) to (d) there is shown how the voltages applied to the grids of tubes 201 and 202 vary with time. Voltages are all given with respect to the mean potential between the two grids. This reference voltage is indicated by the line 301 in FIGS. 3(a) through (d). The sinusoidally varying component of the voltage applied to the grid of tube 201 from the cathode of tube 219 is shown as a function of time in FIG. 3(a) by the curve 302, which may also be regarded as a representation of the path of the scanning spot. Following the same convention, the trace on which the converter is operating may be represented in FIG. 3(a) by the dashed line 306. Curve 304 represents the other component of the voltage applied to the grid of tube 201 from the trace converter output through lead 123.

Due to the aforementioned proportioning of the resistors 215 and 216 and the relative connections to the oscillator and to the output, the curves 304 and 306 will be approximately symmetrical with respect to each other about the axis 301. This symmetry would be exact if the output of the trace converter exactly indicated, with absolutely no lag, the position of the trace and if there were no phase shift between the output and the grids of tubes 201 and 202. However, if the trace is not too steep the departure of curves 304 and 306 from mutual symmetry will be small. It is to be assumed that this departure is negligible.

Curves 303 and 305 in FIG. 3(b) show the component voltages applied to the grid of tube 202 from the cathode of tube 221. The path of the trace is now represented by the dashed line 307 which, with respect to the curve 305, will be approximately symmetrical about the axis 301. The net voltages applied to the grids of tubes 201 and 202 are shown by the curves 308 and 309 in FIGS. 3(c) and 3(d), respectively.

It should now be evident that, to the extent that the curves 304 and 306 in FIG. 3(a) are symmetrical, an intersection of 302 with 306 will correspond to an intersection of the curve 308 in FIG. 3(c) with the axis 301, and will also correspond to the intersection of the curve 303 with 307 in FIG. 3(b), and to the intersection of curve 309 with the axis 301 in FIG. 3(d). Furthermore, these intersections will all be simultaneous with the crossing of the trace by the scanning spot and therefore with the generation of a pulse by the photocell.

The threshold potential, indicated by the dashed lines 310 in FIG. 3(c) and 3(d), is set just above the mean grid potential of tubes 201 and 202 indicated by line 301. The current through tube 214, by which control of the gate 118 is effected, will vary with time as shown in FIG.

3(e). When both grids of tubes 201 and 202 are below the threshold the current through 214 is a maximum so that the potential of lead 125 is reduced to open the gate 118. If either grid is above the threshold the current through tube 214 is a minimum and, in the absence of any action from the gate control circuit 119 in FIG. 1, the gate 118 is closed. Thus, a signal having the same wave shape as shown in FIGURE 3(e) will be developed by tubes 201 and 202. The positive pulses will be developed only when the absolute magnitude of the sum of the signals at input terminals 121—124 is less than a predetermined amplitude.

Figure 3:
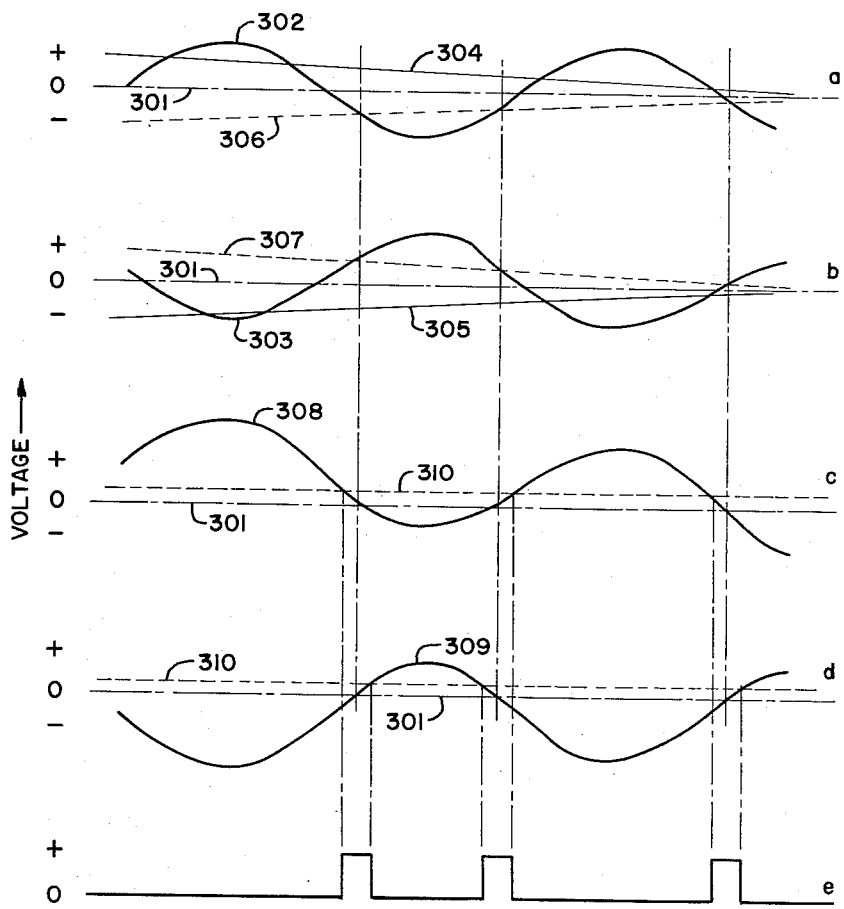

It should be apparent from FIG. 3 that the time interval during which tube 214 acts to open the gate will include the instant at which the scanning spot encounters the trace. The result is that the converter generally "sees" only a strip of the sheet on which the curve is drawn, this strip being approximately centered on the trace. The time during which the gate is open in any scanning cycle will depend upon the slope of the curves 308 and 309 at the point where they cross the axis 301 as well as upon the height of the threshold above the axis. Although this time will increase as the trace moves from the center toward either extremity of the scanning path this increase will be almost exactly compensated by the decreased velocity of the scanning spot in these regions so that the width of the strip seen by the converter remains nearly constant. In general the width of the strip will be directly proportional to the height of the threshold above the axis 301.

The circuit details of the gate control 119 are shown in FIG. 4. When the converter is operating normally, square voltage pulses are applied to lead 126 from the output of the flip-flop 111. These pulses are rectified by rectifiers 401 and 402 and after smoothing by the filtering action of condensers 403 and 404, and resistor 405 appear as a positive voltage on the grid of tube 406. In the absence of pulses on lead 126 the battery 407 biases the grid of tube 406 so far negative that the current through this tube is small. Under this condition the relay 408 is in its unoperated position, the lead 125 is connected directly to ground through the back contact of the relay and the gate is thereby held open. However, when a regular series of pulses are applied to the lead 126, the resulting positive voltage on the grid of tube 406 increases the current through the tube, relay 408 operates to open the ground on lead 125, and the gate will be opened or closed as determined by the current through tube 214. The capacitors and resistances in the filter just preceding tube 406 are chosen so that there is a lag between application or cessation of pulses on 126 and the corresponding response of the relay equal to several scanning periods.

In normal operation the converter sees only a narrow path in the vicinity of the trace. If for any reason the trace is lost either because of its disappearance or because of a sudden shift which the converter is unable to follow, the gate is opened by the gate control 119 so that the converter can see the whole width of the scan. When pulses are again received the gate again assumes control, but not until the transient impressed on the output as a result of the sudden change in the position of the trace has disappeared.

The circuit of a gate which has been used satisfactorily in one embodiment of this invention is shown in FIG. 5. This circuit is based on the Schmitt trigger. It comprises a conventional trigger circuit consisting of tubes 502 and 503 wherein an input pulse is applied to tube 502 by way of lead 127. The anode and cathode of tube 501 are connected to the anode and cathode respectively of tube 502. Thus, the outputs of tubes 501 and 502 are connected in parallel. Suppose that the lead 125 is at a potential which holds the gate open. Under these conditions tube 501 is cut off and a regenerative loop is formed between tubes 502 and 503 which are coupled through the capacitor 504 and resistor 505 as well as the common cathode resistor 506. Circuit constants are chosen so that this system has two stable states, one in which tube 502 is conducting and tube 503 is cut off, the other in which tube 502 is cut off and tube 503 is conducting. If the lead 127 is sufficiently positive the system is in the first state, if the lead is sufficiently negative the system is in the second state. As the potential of lead 127 is reduced there is a fairly well defined point at which the system will suddenly flip over from the first to the second state. At another slightly higher critical potential with an increasing potential on lead 127 the system will revert to the first state. The lead 127 is maintained at a sufficient positive potential so that in the absence of a pulse from the photocell the system is in the first state.

Signals resulting from the interception of the light spot by the trace appear on lead 127 as negative going pulses. If the potential on lead 125 is then sufficiently low to prevent conduction through tube 501, so that the gate is open, each of these pulses will produce a transition to the second state and an increased voltage drop across resistor 507 with a reduction in the potential of lead 128. Thus pulses from the photocell will appear in amplified form on lead 128.

When lead 125 is made sufficiently positive the gate will be closed. Under these conditions current passing through tube 501 causes a voltage drop across resistor 508 which maintains the potential of the grid of tube 503 below the cut-off point irrespective of the current through tube 502, so that pulses applied to lead 127 have no effect on the potential of lead 128.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A scanning trace converter having a first means for producing a scanning beam of light for a trace on a moving strip of material, a second means responsive to the passage of said light beam across said trace to produce an output signal, an oscillator means connected to control the frequency of scanning of said beam, a third means controlled by said second means to produce the output of said trace converter, a fourth means gating the output of said second means to said third means, a fifth means connected to be responsive to the combined outputs of said trace converter and the output of said oscillator means to control the opening and closing of said fourth means, a bistable circuit connected to be shifted from one stable state to the other by said oscillator means and said fourth means, a seventh means controlled by one state of said bistable circuit to render the control of the opening and closing of said fourth means unoperative.

2. A trace converter as in claim 1 wherein said fourth means is a gate circuit having two stable conditions of operation.

3. A trace converter as in claim 2 wherein said fifth means includes a phase shifting circuit and a comparison circuit.

4. A trace converter as defined in claim 3 wherein said seventh means grounds the control signal of said fifth means to render it unoperative to affect said fourth means.

5. A trace converter as in claim 4 wherein said gate circuit includes first, second and third electron discharge devices and circuit means connected thereto whereby upon the application of a signal to said first device said first and second devices each shift from one stable state to another and upon the application of a signal to said third device said first device is rendered non-conductive.

6. A trace converter as in claim 5 wherein said comparison circuit includes first, second and third means interconnected to receive input signals, obtain the algebraic sum thereof, and produce another signal which shifts said third means from one stable state to another.

7. A comparison circuit having a first and second alternating input signals, a first means for obtaining the algebraic sum of said first and second signals, a second means responsive to said sum to produce a signal only when the absolute value of the amplitude of said sum is less than a minimum value, a third means determining said minimum value, a fourth means having two stable states of operation, said fourth means being responsive to the signal from said second means to shift from one stable state to the other stable state.

8. A gating circuit comprising a first and a second electron discharge device, said devices having two stable conditions of operation, said first device being responsive to an applied signal to shift from one of said stable conditions to the other, said second device being connected to be shifted from a conductive to a non-conductive condition of operation when said first device is shifted from a non-conductive to a conductive condition of operation, a third electron discharge device connected in parallel with said first device to render said second device non-conductive when a signal is applied to said third device, said second device providing an output which is the applied signal amplified when no signal is applied to said third device.

9. A trace converter as in claim 2, wherein said gate circuit comprises a first and a second electron discharge device, said devices having two stable conditions of operation, said first device being responsive to an applied signal to shift from one of said stable conditions to the other, said second device being connected to be shifted from a conductive to a non-conductive condition of operation when said first device is shifted from a non-conductive to a conductive condition of operation, a third electron discharge device connected in parallel with said first device to render said second device non-conductive when a signal is applied to said third device, said second device providing an output which is the applied signal amplified when no signal is applied to said third device.

10. A trace convertor as in claim 2 wherein said fifth means includes a phase shifting circuit and a comparison circuit, said comparison circuit having a first and second alternating input signal, said first alternating input signal consisting of the output of said trace convertor and said second alternating input signal consisting of the output of said oscillator, and eighth means for obtaining the algebraic sum of said first and second alternating input signals, a ninth means responsive to said sum to produce a signal only when the absolute value of the amplitude of said sum is less than a minimum value, a tenth means determining said minimum value, and eleventh means having two stable states of operations, said eleventh means being responsive to the signal from said ninth means to shift from one stable state to the other stable state, whereby the ouput of said eleventh means is used to control the opening and closing of said fourth means.

11. A trace converter as in claim 9 wherein said fifth means includes a phase shifting circuit and a comparison circuit, said comparison circuit having a first and second alternating input signal, said first alternating input signal consisting of the output of said trace converter and said second alternating input signal consisting of the output of said oscillator, and eighth means for obtaining the algebraic sum of said first and second signals, a tenth means responsive to said sum to produce a signal only when the absolute value of the amplitude of said sum is less than a minimum value, tenth means for determining said minimum value, and eleventh means having two stable states of operation, said eleventh means being responsive to the signal from said ninth means to shift from one stable to the other stable state, whereby the output of said eleventh means is used to control the opening and closing of said fourth means.

References Cited in the file of this patent

UNITED STATES PATENTS

| | | |
|---|---|---|
| 2,489,305 | McLennan | Nov. 29, 1949 |
| 2,624,848 | Hancock et al. | Jan. 6, 1953 |
| 2,857,802 | Cail | Oct. 28, 1958 |
| 2,883,557 | Gallo | Apr. 21, 1959 |
| 2,886,717 | Williamson et al. | May 12, 1959 |
| 2,924,710 | Smith | Feb. 9, 1960 |
| 2,934,708 | Stuntz | Apr. 26, 1960 |